(12) United States Patent
Jansson

(10) Patent No.: US 8,985,914 B2
(45) Date of Patent: Mar. 24, 2015

(54) CUTTING TOOL, AN ARRANGEMENT AND A METHOD FOR CHIP REMOVING MACHINING WITH SPRING MEMBERS FOR BIASING A CLAMPING BODY

(75) Inventor: Mikael Jansson, Avesta (SE)

(73) Assignee: Seco Tools AB, Fagersta (SE)

(*) Notice: Subject to any disclaimer, the term of this patent is extended or adjusted under 35 U.S.C. 154(b) by 1650 days.

(21) Appl. No.: 12/302,304

(22) PCT Filed: May 15, 2007

(86) PCT No.: PCT/SE2007/050330
§ 371 (c)(1),
(2), (4) Date: Nov. 25, 2008

(87) PCT Pub. No.: WO2007/139483
PCT Pub. Date: Dec. 6, 2007

(65) Prior Publication Data
US 2009/0175693 A1 Jul. 9, 2009

(30) Foreign Application Priority Data

May 31, 2006 (SE) .................................... 0601204

(51) Int. Cl.
*B23C 5/24* (2006.01)
*B23B 27/16* (2006.01)

(52) U.S. Cl.
CPC ............. *B23C 5/2479* (2013.01); *B23C 5/2472* (2013.01); *B23C 5/2403* (2013.01); *B23C 5/2406* (2013.01); *B23C 5/241* (2013.01); *B23C 5/2413* (2013.01); *B23C 5/2417* (2013.01); *Y10T 407/1914* (2015.01); *Y10T 407/1908* (2015.01); *Y10T 407/1922* (2015.01); *B23B 27/1685* (2013.01); *B23C 5/2437* (2013.01); *B23C 5/2462* (2013.01); *B23C 2240/24* (2013.01); *B23C 2260/84* (2013.01)
USPC ................................................ 407/36; 407/37

(58) Field of Classification Search
USPC ............ 407/36, 37, 38, 39, 43, 44, 47, 49, 41
See application file for complete search history.

(56) References Cited

U.S. PATENT DOCUMENTS

| 3,339,257 | A | * | 9/1967 | Hargreaves et al. | ............. | 407/38 |
| 3,616,507 | A | * | 11/1971 | Wirfelt | ............. | 407/40 |
| 3,786,545 | A | * | 1/1974 | Wirfelt | ............. | 407/40 |
| 3,792,517 | A | * | 2/1974 | Gage | ............. | 407/37 |
| 4,044,440 | A | * | 8/1977 | Stier | ............. | 407/105 |
| 4,090,801 | A | * | 5/1978 | Faber | ............. | 407/113 |
| 4,204,781 | A | * | 5/1980 | Johann | ............. | 407/105 |
| 4,245,937 | A | * | 1/1981 | Erickson | ............. | 407/105 |

(Continued)

FOREIGN PATENT DOCUMENTS

DE 4330484 A1 3/1995
JP 64002813 A * 1/1989

(Continued)

*Primary Examiner* — Kenneth E. Peterson
*Assistant Examiner* — Jennifer Swinney
(74) *Attorney, Agent, or Firm* — WRB-IP LLP

(57) ABSTRACT

In a cutting tool for chip removing machining a holder for a cutter has a body received therein and movable with surfaces to bear against the cutter for defining the position of the cutter in the direction of an intended axis of rotation of the holder as well as a screw which may be screwed in a threaded bore in the holder. Spring members are arranged to act between the holder and the body for biasing the body against said screw portions.

17 Claims, 3 Drawing Sheets

(56) References Cited

U.S. PATENT DOCUMENTS

| | | | |
|---|---|---|---|
| 5,391,023 A * | 2/1995 | Basteck | 408/146 |
| 5,863,156 A * | 1/1999 | Satran et al. | 407/36 |
| 6,619,892 B2 * | 9/2003 | Enquist | 407/36 |
| 6,655,879 B2 * | 12/2003 | Grehn | 407/44 |
| 7,114,890 B2 * | 10/2006 | Noggle | 407/36 |
| 7,261,495 B1 * | 8/2007 | Nelson et al. | 407/105 |
| 2002/0110428 A1 | 8/2002 | Noggle | |

FOREIGN PATENT DOCUMENTS

| | | | |
|---|---|---|---|
| SU | 778950 B | * | 11/1980 |
| SU | 1166914 A | * | 7/1985 |
| SU | 1340929 A | * | 9/1987 |
| WO | 0200382 A1 | | 1/2002 |

* cited by examiner

CUTTING TOOL, AN ARRANGEMENT AND A METHOD FOR CHIP REMOVING MACHINING WITH SPRING MEMBERS FOR BIASING A CLAMPING BODY

BACKGROUND AND SUMMARY

The present invention relates to a cutting tool for chip removing machining, preferable milling, comprising at least one cutter, a holder holding the cutter, means for securing the cutter to the holder with a cutting edge of the cutter in a selectable cutting functional position in the direction of an intended axis of rotation of the holder as well as an arrangement for determining the position of the cutter with respect to the holder in the direction of said axis of rotation for enabling securing of the cutter through said means with the cutting edge in said selectable position, said arrangement comprising a body movably received in the holder and movable with surfaces to bear against the cutter for defining the position of the cutter in the direction of said axis of rotation as well as a screw which may be screwed in a threaded bore in the holder transversally to said axis of rotation and which has portions adapted to act upon said body in the direction of said axis of rotation upon screwing in said threaded bore, as well as an arrangement for determining the position of a cutter with respect to a holder in a cutting tool according to the preamble of the appended independent arrangement claim and a method for securing a cutter to a holder in a cutting tool according to the preamble of the appended method claim.

The invention relates to cutting tools for chip removing machining in general, such as for example turning or milling, but it is particularly interesting for machining in the form of milling, especially face milling, which is the reason for describing exactly this application hereinafter for illuminating, but accordingly not restricting the invention. In a cutting tool of the type defined in the introduction in the form of a face milling cutter one or more cutters may be arranged adjacent to a said arrangement for adjusting the position of a cutting edge on exactly these cutters. It is usually a question of cutters which have to project with the cutting edge thereof in the direction of said axis of rotation, i.e. in the cutting depth direction of the face milling cutter, longer than the corresponding cutting edge of the rest of the cutters of the cutting tool. It is important to be able to set or adjust the selectable cutting functional position of said cutting edge with a high accuracy so as to obtain an even surface in the face milling operation.

U.S. Pat. No. 5,391,023 describes a cutting tool of the type defined in the introduction. Said screw is in this cutting tool screwed into the holder thereof and displaces than a body, which in its turn displaces a cutter so that a cutting edge of the cutter arrives to a desired position. When the screw has been screwed in so far that the desired position of the cutting edge has been reached the screw has to be locked through a locking unit. When the locking of the screw and by that the body is carried out by means of the locking unit the setting of the cutter is influenced, so that there is a risk that it will differ from the desired position. Another drawback of this cutting tool and the arrangement thereof for determining the position of the cutter consists in that there is a play between said body and a bore in the holder receiving the body, which means that this play will during later machining be absorbed and change the position of the cutting edge.

It is desirable to provide a cutting tool of the type defined in the introduction for which said selectable position of the cutting edge of said cutter may be obtained with a higher accuracy than for such cutting tools already known.

According to an aspect of the present invention, a cutting tool is arranged with spring members adapted to act between the holder and said body for biasing the body against said portions of the screw.

This means that no locking unit is required, since the body of said arrangement will always be kept biased, i.e. under pretension, against said portions of the screw. Thus, the position of said body and by that the cutter will not be influenced by carrying out any locking of the body as for cutting tools of this type already known.

According to an embodiment of the invention said spring members are adapted to press said body oppositely to the screwing home direction of said screw in said threaded bore against said portions of the screw. This constitutes an advantageous and simple way of obtaining biasing of the body against screw portions for defining an exact position of the body and by that the cutter before this is secured with respect to the holder by said means.

According to another embodiment of the invention the cutter is so arranged in the holder with respect to said screw that the screw is adapted to influence the body to be displaced with said surfaces in the direction against said cutting edge upon screwing the screw in the unscrewing direction in said threaded bore so as to reach a position defining said selectable position of the cutting edge. It is totally contrary to cutting tools of this type already known to unscrew a screw in an arrangement of this type until the correct position has been reached of said body and by that the cutter influenced thereby, wherein in the cutting tools already known a screw is screwed in the screwing home direction for displacing a said body and by that the cutter to the desired position. This in combination with said biasing makes it very comfortable to carry out the adjustment of the cutter before it is secured to the holder.

According to another embodiment of the invention the holder is designed to hold the cutter with a surface directed towards said body and inclined with respect to a centre axis of said threaded bore for translating an axial movement of the screw when screwing into a movement of the body so that this comes closer to the cutter or displaces this in said intended rotation axis direction.

According to another embodiment of the invention said portion of the screw comprises a part of the lower side of a head of the screw, and the head of the screw may according to another embodiment of the invention be substantially conical, and said body has then a substantially conical part designed to provide said surface for bearing against said screw portions. A well defined very exact position of the body at a determined screwing depth of the screw is obtained by this conical shape in combination with said biasing.

According to another embodiment of the invention said body is sleeve-like with a through hole designed to receive the screw, and said screw portion is adapted to bear against said surfaces in the form of inner surfaces of the sleeve-like body. The holder has then advantageously a cavity, in the bottom of which said threaded bore is arranged, and this sleeve-like body is received in the cavity while being displaceable in the direction of said threaded bore.

According to another embodiment of the invention said spring members are formed by a compression spring, for example in the form of one or more cup springs, arranged to act between the bottom of said cavity and surfaces of the lower side of the sleeve-like body directed towards the cavity. Said biasing may by this be obtained through very simple means and with a higher accuracy.

According to another embodiment of the invention the location of the threaded bore in the cavity and the design of the sleeve-like body are so adapted to each other that the sleeve-like body is pressed tightly against a lateral wall of said cavity upon biasing action of said screw portions upon the body. Any play between said body and the bore in the holder and by that the holder is by this eliminated, so that at the same time the drawbacks mentioned above of such a play are eliminated and said selectable position of the cutting edge may be obtained with a very high accuracy.

More exactly, this may according to another embodiment of the invention be realized by the fact that the centre axis of said threaded bore is laterally displaced with respect to the centre axis of said cavity for pressing the sleeve-like body tightly against a lateral wall of said cavity on biasing action of said screw portions upon the body. Thus, a certain eccentricity is present between the cavity and the threaded bore for reliably eliminating said play.

According to another embodiment of the invention the cutting tool comprises a plurality of cutters distributed on the holder around said intended axis of rotation, and only some of said cutters of the cutting tool are arranged adjacent to a said arrangement for position determination. It is then preferred that the cutting tool is a face milling cutter. It is also within the scope of the invention to have a said arrangement adjacent to all cutters.

The invention also relates to an arrangement according to an aspect of the invention provided with spring members adapted to act between the holder and said body for biasing the body against said portions of the screw. The advantages of such an arrangement as well as an arrangement according to different embodiments of the invention as clearly as desired from the description above of the cutting tool according to the invention.

The invention also relates to a method for securing a cutter to a holder of a cutting tool of the type defined in the introduction, for a cutting tool which further has spring members adapted to act between the holder and said body for biasing the body against said portions of the screw, the screw is firstly screwed in the screwing home direction in the threaded bore, the screw is then screwed in the unscrewing direction in the threaded bore until the body influences said cutter in the direction of said intended axis of rotation to reach said selectable position, and then the cutter is then secured in this position. This constitutes a simple and comfortable way to obtain a precise securing of the cutter in a selectable position with respect to the holder of the cutting tool.

Further advantages as well as advantageous features of the invention appear from the description following.

BRIEF DESCRIPTION OF THE DRAWINGS

With reference to the appended drawings, below follows a specific description of an embodiment of the invention cited as an example.

In the drawings.

DETAILED DESCRIPTION

Figure 1:
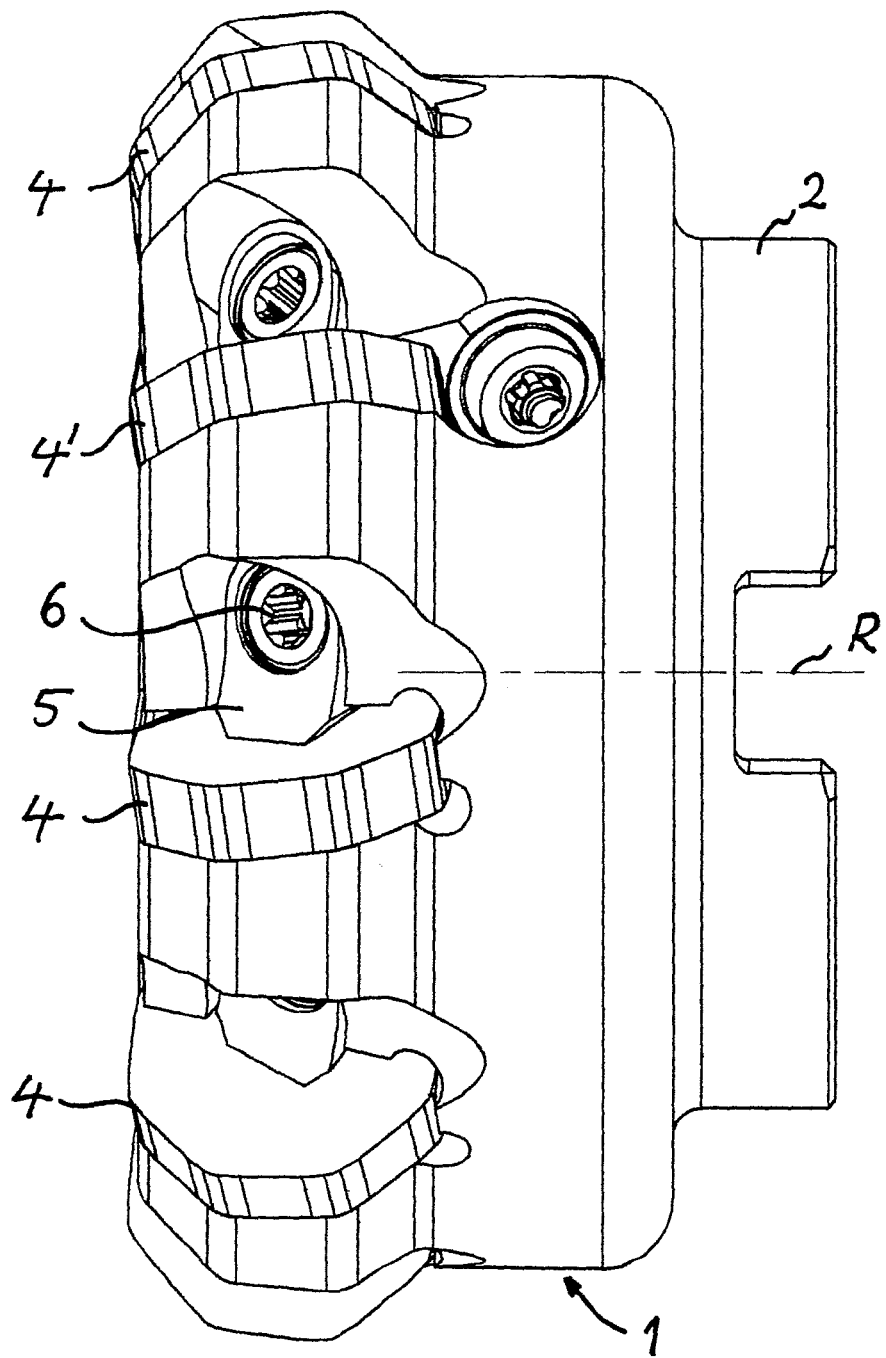
FIG. 1 is a side-elevation of a cutting tool in the form of a face milling cutter according to an embodiment of the invention.
Figure 2:
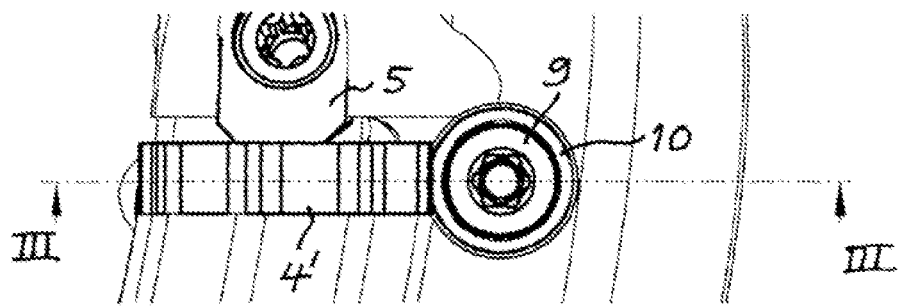
FIG. 2 is an enlarged view of a part of the face milling cutter according to FIG. 1.
Figure 3:
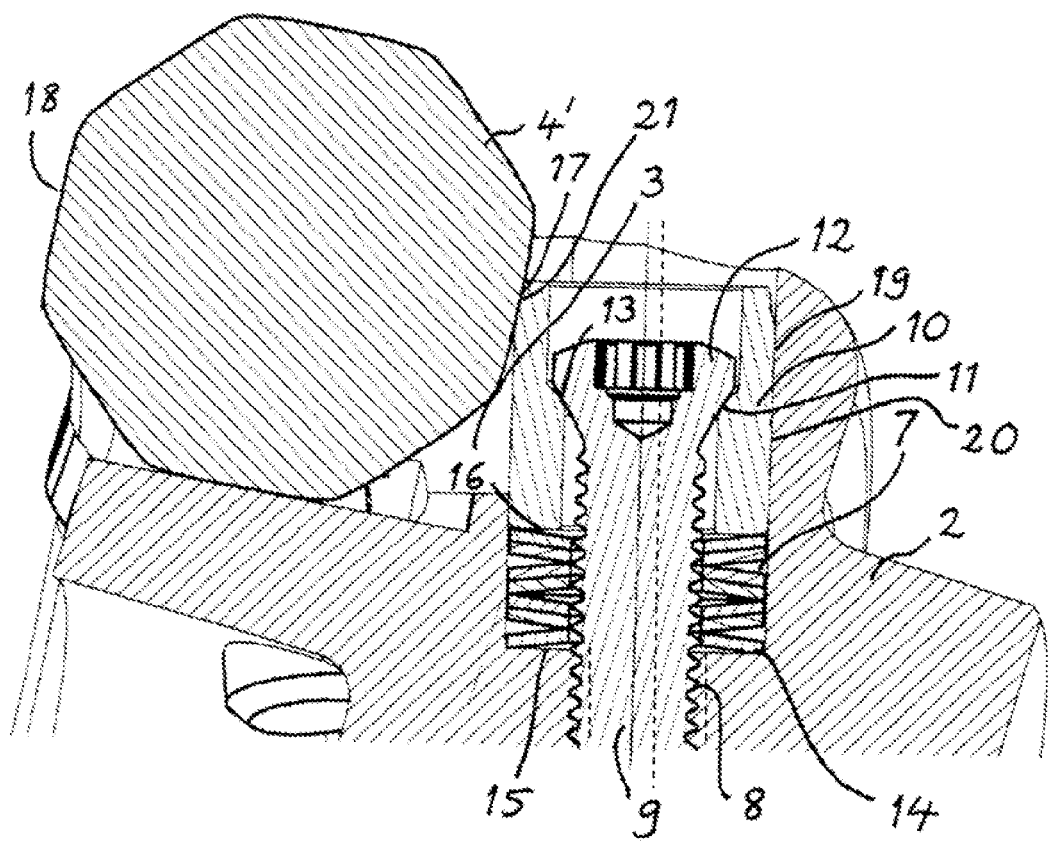
FIG. 3 is a section along the line III-III in FIG. 2 in a further enlarged view.

FIG. 1 illustrates a cutting tool, preferably for metal machining, in the form of a face milling cutter 1 with a conventional design with a holder 2 in the form of a milling body, which is provided with a number of pockets 3 (see also FIG. 3) for receiving cutters 4 of hard and wear resistant material. Means for securing the respective cutter to the holder in the form of wedge members 5 and screws 6 for clampingly tightening the wedge members against the respective cutter are arranged between the cutters 4. Furthermore, one single cutter, namely the cutter 4', has here an arrangement associated therewith for determining the position of this cutter with respect to the holder in the direction of an intended axis of rotation R of the holder for enabling securing of this cutter through said means with the cutting edge in a selectable position, more exactly so that the cutting edge of this cutter which projects most far in the cutting depth direction of the face milling cutter will project longer than the cutting edges of the other cutters. A face milling cutter with this design is generally known, and it is how said position determination of the cutter 4' is achieved that is subject of the present invention and will now be described with reference also to FIGS. 2 and 3.

The holder has in said amine depth direction behind the cutter 4' a cavity 7 extending substantially perpendicularly to said intended axis of rotation R, in the bottom of which cavity a threaded bore 8 is arranged. A screw 9 with suitable thread may be screwed into the threaded bore 8. The centre axis of the threaded bore is somewhat displaced with respect to the centre axis of the cavity, more exactly somewhat to the right in FIG. 3. This displacement may typically be in the order of one or a few tenths of a millimeter and is shown in a highly exaggerated fashion in phantom in FIG. 3. A sleeve-like body 10 is received in the cavity and movable in the longitudinal direction of the cavity, and the screw 9 is movable into the sleeve-like body 10 to bear with conical portions 11 of the lower side of the screw head 12 against substantially conical surfaces 13 inside the sleeve-like body. The threaded bore 8 may be arranged with the centre axis thereof extending at an angle with respect to the intended axis of rotation R between 0° and 90°.

Furthermore, compression spring members in the form of several cup springs 14 are arranged to act between the bottom 15 of the cavity 7 and the lower side 16 of the sleeve-like body 10 so as to by biasingly press the conical surfaces 13 of the body 10 against the conical portions 11 of the screw.

The cutter 4' has a surface or clearance surface 17 directed against the body 10 inclined with respect to the centre axis of the threaded bore 8. This inclined surface 17 is intended to bear against a surface 21 of the body 10 when the position of the cutter 4' is adjusted, so that the body will define the position of the cutter by translation of an axial movement of the screw and by that of the body into a displacement movement of the cutter in the direction of said intended axis of rotation R. The displacement takes place not only in the direction of said axis of rotation, but it has a component in that direction.

Wedge members 5 lying close to the cutter are realised for securing the cutter 4' with the front cutting edge 18 thereof in a selectable position with respect to the holder, and the cutter is placed with the inclined surface 17 thereof in abutment against the body 10. The screw 9 is after that screwed in a screwing home direction comparatively far into the threaded bore 8. The compression spring 14 will then keep the body 10 with the surfaces 13 thereof in biased bearing against the screw portions 11 and a lateral wall 19 of the body will at the same time thanks to the eccentrically arrangement of the treaded bore 8 with respect to the cavity 7 be pressed against corresponding delimiting wall 20 of the cavity, so that the body 10 will all the time without the slightest play be secured laterally with respect to the cavity and by that the holder. This pressing of the lateral wall of the body against a delimiting wall of the cavity makes it possible to design the body with somewhat smaller outer dimensions than the inner dimensions of the cavity, so that the body may easily be moved inside the cavity, without causing the position of the body to be the slightest undefined for that sake.

The screw is then screwed in the unscrewing direction out of the threaded bore 8, in which the body 10 will through the action of the compression spring 14 follow the screw in this movement while simultaneously displace the cutter 4' through action upon the surface 17 thereof. The screw is unscrewed until the desired selectable position has been reached for the cutting edge 18. The cutting edge is then secured in this position by tightening the adjacent wedge member 5, so that this clamps the cutter in the desired position.

Later on when the cutting edge is worn out the cutter having 8 cutting edges may be indexed and secured again in the way just described.

Figure 4:
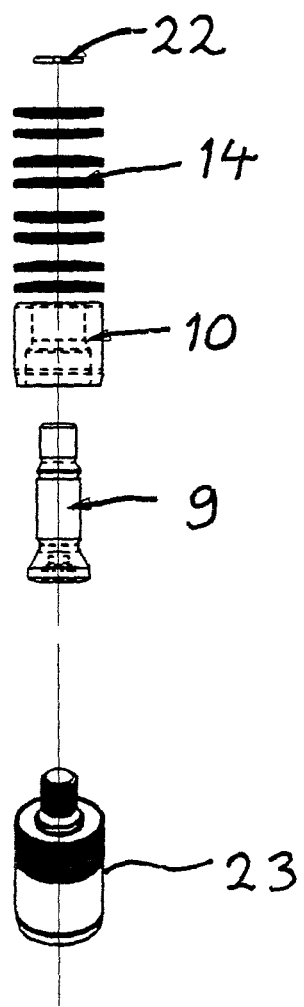
FIG. 4 shows on one hand an exploded view of a part of an arrangement according to the invention and on the other this part of the arrangement in assembled state.

FIG. 4 shows said body 10, spring members in the form of cup springs 14, the screw 9 and a locking ring 22 in an exploded view, which according to the invention may be provided premounted in each other, so that they may be handled as one part 23 shown at the bottom in the figure. This is important for the user friendliness of the arrangement according to the invention.

The invention is not in any way restricted to the embodiment described above, but many possibilities to modifications thereof would be apparent to a person with skill in the art without departing from the basic idea of the invention as this is defined in the appended claims.

The expression "the threaded bore" is to be interpreted broadly and shall also comprise the case of a ring-shaped hole with a thread on the inner or outer ring wall, so that the screw even may have a hollow sleeve-like shaft and be provided with an inner thread cooperating with the thread in the hole.

With respect to the elimination of a play, instead of the eccentric arrangement of the threaded hole and the cavity one wall of the sleeve-like body may be designed differently than the opposite sleeve wall so as to be pressed against a lateral wall of the cavity.

The spring 14 has not to be of a cup spring type, but any suitable spring type may be utilized.

The cutters 4, 4' may be identical or different.

The disclosures in Swedish patent application No. 0601204-1, from which this application claims priority are incorporated herein by reference.

The invention is in no manner limited to the above-captioned embodiments and can be freely modified within the scope of the appended claims.

The invention claimed is:

1. A cutting tool for chip removing machining, comprising
   at least one cutter,
   a holder holding the cutter,
   means for securing the cutter to the holder with a cutting edge of the cutter in a selectable cutting functional position in a direction of an intended axis of rotation of the holder, and
   an arrangement for determining a position of the cutter with respect to the holder in a direction of the axis of rotation for enabling securing of the cutter through the means with the cutting edge in the selectable position, the arrangement comprising
      a body movably received in the holder and having surfaces to bear against the cutter for defining the position of the cutter in the direction of the axis of rotation,
      a screw adapted to be screwed in a threaded bore in the holder, the screw having portions adapted to act upon the body in the direction of the axis of rotation upon screwing the screw into the threaded bore, and,
      spring members adapted to act between the holder and the body for biasing the body against the portions of the screw,
   wherein the body is a sleeve with a through-hole adapted to receive the screw, the screw portions are adapted to bear against the surfaces in the form of inner surfaces of the body, the holder has a cavity, in the bottom of which the threaded bore is arranged, and the body is received in the cavity while being displaceable in the direction of the threaded bore, the spring member is formed by a compression spring adapted to act between the bottom of the cavity and surfaces of a lower side of the body directed towards the bottom, the centre axis of the threaded bore is laterally displaced with respect to the centre axis of the cavity for pressing the body against a lateral wall of the cavity upon biasing action of the screw portions upon the body.

2. A cutting tool according to claim 1, wherein the spring members are adapted to press the body oppositely to the screwing home direction of the screw in the threaded bore against the portions of the screw.

3. A cutting tool according to claim 1, wherein the cutter is so arranged in the holder with respect to the screw that the screw is adapted to influence the body to be displaced with the surfaces in the direction against the cutting edge upon screwing the screw in the unscrewing direction in the threaded bore so as to reach a position defining the selectable position of the cutting edge.

4. A cutting tool according to claim 1, wherein the holder holds the cutter with a surface that is directed towards the body and that is inclined with respect to a centre axis of the threaded bore so that when the screw is screwed into the body the surface comes closer to the cutter or displaces the cutter in the intended rotation axis direction.

5. A cutting tool according to claim 1, wherein the portions of the screw comprise a part of the lower side of a head of the screw.

6. A cutting tool according to claim 5, wherein the head of the screw is substantially conical, and that the body has a substantially conical part designed to provide the surfaces for bearing against the screw portions.

7. A cutting tool according to claim 1, wherein the location of the threaded bore in the cavity and the design of the body are so adapted to each other that the body is pressed against a lateral wall of the cavity on biasing action of the screw portions upon the body.

8. A cutting tool according to claim 1, wherein the threaded bore is arranged with a centre axis thereof extending substantially perpendicularly to the intended axis of rotation.

9. A cutting tool according to claim 1, wherein the threaded bore is arranged with the centre axis thereof extending at an angle with respect to the intended axis of rotation between 0° and 90°.

10. A cutting tool according to claim 1, wherein the securing means comprises a wedge and means for tightening the wedge with respect to the holder for clampingly securing the cutter in a position determined by the arrangement.

11. A cutting tool according to claim 1, comprising a plurality of cutters distributed on the holder around the intended axis of rotation.

12. A cutting tool according to claim 11, wherein fewer than all of the cutters of the cutting tool are arranged adjacent to the arrangement for position determination.

13. A cutting tool according to claim 1, wherein the cutting tool is a face milling cutter.

14. An arrangement according to claim 13, wherein the spring members are adapted to press the body oppositely to the screwing home direction of the screw in the threaded bore against the portions of the screw.

15. An arrangement according to claim 13, wherein the screw is so arranged with respect to the cutter that it is designed to act upon the body to be displaced with the surfaces for acting upon the cutter in the direction against the cutting edge upon screwing the screw in the unscrewing direction in the threaded bore so as to reach a position defining the selectable position of the cutting edge.

16. An arrangement for determining the position of a cutter with respect to a holder in a cutting tool for chip removing machining in a direction of an intended axis of rotation for the holder for enabling securing of the cutter with a cutting edge in a selectable cutting functional position in the direction of the axis of rotation, the arrangement comprising
   a body movably received in the holder and having surfaces for bearing against the cutter for defining the position of the cutter in the direction of the axis of rotation,
   a screw adapted to be screwed in a threaded bore in the holder transversally to the axis of rotation the screw having portions adapted to act upon the body in the direction of the axis of rotation when the screw is screwed into the threaded bore, and
   spring members adapted to act between the holder and the body for biasing the body against the portions of the screw,
   wherein the body is a sleeve with a through-hole adapted to receive the screw, the screw portions are adapted to bear against the surfaces in the form of inner surfaces of the body, the holder has a cavity, in the bottom of which the threaded bore is arranged, the body is received in the cavity while being displaceable in the direction of the threaded bore, the spring member is formed by a compression spring adapted to act between the bottom of the cavity and surfaces of a lower side of the body directed towards the bottom, and the centre axis of the threaded bore is laterally displaced with respect to the centre axis of the cavity for pressing the body against a lateral wall of the cavity upon biasing action of the screw portions upon the body.

17. A method for securing a cutter to a holder of a cutting tool for chip removing machining with a cutting edge of the cutter in a selectable cutting functional position in a direction of an intended axis of rotation of the holder, the cutting tool comprising a body movably received in the holder and movable with surfaces to bear against the cutter for defining the position of the cutter in the direction of the axis of rotation as well as a screw which may be screwed in a screwing home direction and in an unscrewing direction in a threaded bore in the holder transversally to the axis of rotation and which has portions adapted to act upon the body in the direction of the axis of rotation upon screwing in the threaded bore, the cutting tool further comprising spring members adapted to act between the holder and the body for biasing the body against the portions of the screw, wherein the body is a sleeve with a through-hole adapted to receive the screw, the screw portions are adapted to bear against the surfaces in the form of inner surfaces of the body, the holder has a cavity, in the bottom of which the threaded bore is arranged, the body is received in the cavity while being displaceable in the direction of the threaded bore, the spring member is formed by a compression spring adapted to act between the bottom of the cavity and surfaces of a lower side of the body directed towards the bottom, and the centre axis of the threaded bore is laterally displaced with respect to the centre axis of the cavity for pressing the body against a lateral wall of the cavity upon biasing action of the screw portions upon the body, comprising
   screwing the screw in the screwing home direction in the threaded bore,
   after screwing the screw in the screwing home direction, screwing the screw in the unscrewing direction in the threaded bore until the body influences the cutter in the direction of the intended axis of rotation to reach the selectable position, and
   securing the cutter in the selectable position.

* * * * *